July 24, 1956        G. JERNAKOFF        2,756,339
VARIABLE FREQUENCY OSCILLATOR FOR MASS SPECTROMETER
Filed April 30, 1954
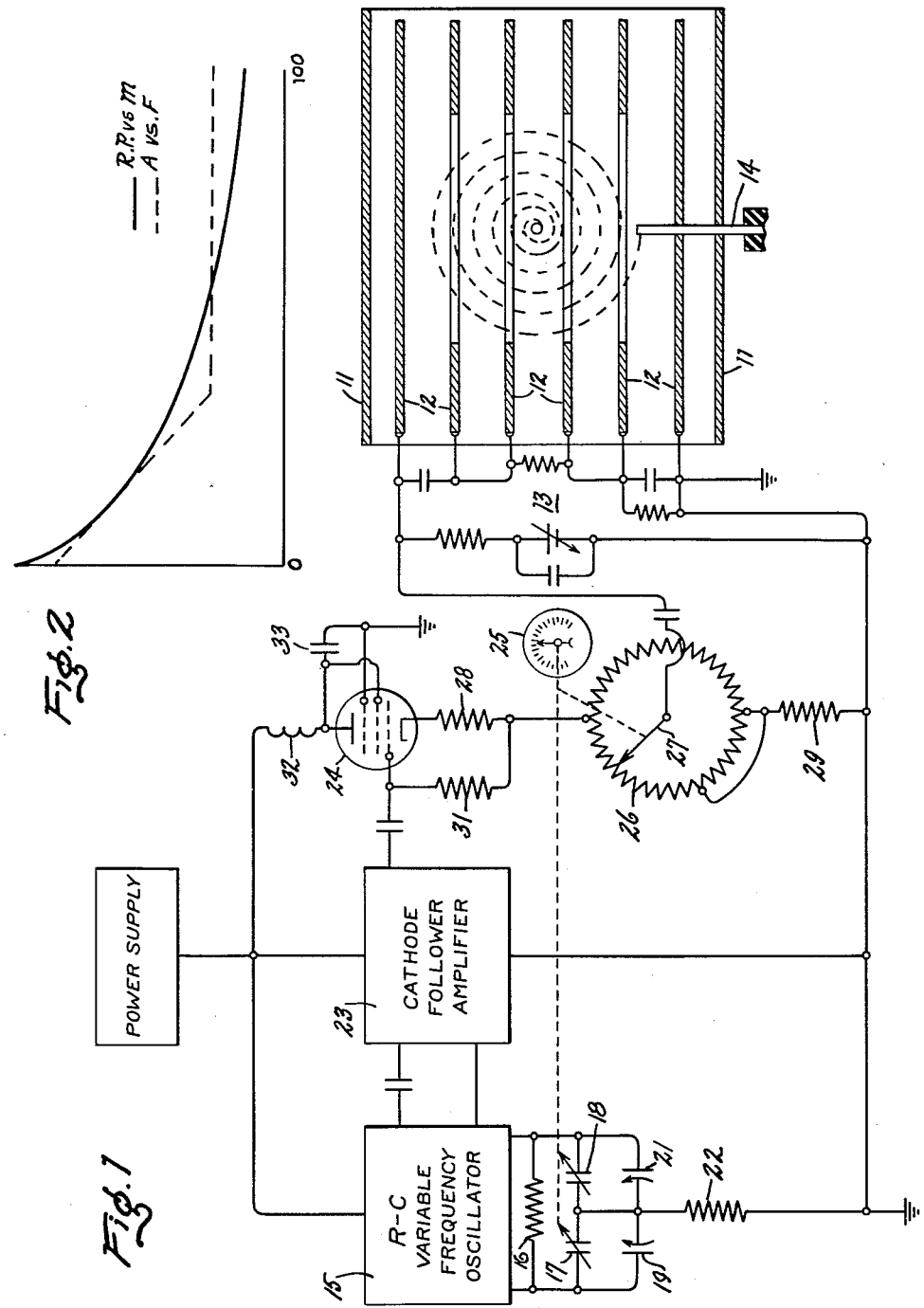
Inventor
George Jernakoff
by Charles W Helzer
His Attorney United States Patent Office 2,756,339
Patented July 24, 1956

2,756,339

VARIABLE FREQUENCY OSCILLATOR FOR MASS SPECTROMETER

George Jernakoff, Schenectady, N. Y., assignor to General Electric Company, a corporation of New York Application April 30, 1954, Serial No. 426,879

15 Claims. (Cl. 250—41.9)

The present invention relates to an energizing circuit for a mass spectrometer of the ion resonance type.

More particularly, the invention relates to a mass spectrometer of the ion resonance type that utilizes the combined action of crossed magnetic and radio frequency electric fields to effect separation of ions having different mass to charge ratios, and to a variable frequency oscillator for supplying the radio frequency alternating electric energy thereto.

In order to use effectively mass spectrometers of the above-identified type, it is necessary that the instrument be capable of operating over a range of mass values. For such operation to be accomplished, it is essential that either the frequency of the alternating electric energy or the strength of the magnetic field be variable over some predetermined range of values. Because of certain difficulties that arise if the magnetic field strength is varied in order to operate the instrument at different mass values, it is desirable that the technique of varying the frequency of the alternating electric energy be used for this purpose. However, the use of the latter technique is not without its limitations in that, because of the innate characteristics of the ion resonance mass spectrometer, ordinary radio frequency electric energy sources cannot be used with the instrument effectively. One of these characteristics is due to the non-linear manner in which the ion resonance mass spectrometer responds to variations in frequency. Hence, with ordinary alternating electric signal generators whose frequency determining components have not been specially designed to compensate for this defect, there is a tendency to produce crowding of the mass resonance points at the high mass values in the operating range. Further, this characteristic makes it extremely difficult to provide the instrument with a mass indicator that has a linear scale. Another characteristic which complicates the selection of a suitable energizing source is the tendency of the instrument to decrease in resolving power at higher mass values with constant amplitude alternating electric energizing signals supplied thereto.

It is, therefore, one object of the present invention to provide an energizing circuit for a mass spectrometer of the ion resonance type wherein the particular mass to be analyzed can readily be varied over a wide range of values by merely varying the frequency of alternating electric energy supplied to the instrument, and wherein a linear relationship exists between the variation in a component of the frequency determining element of the energizing circuit and the variation in mass over the entire mass range to be analyzed.

Another object of the invention is to provide an energizing circuit of the above type which includes a simple and efficient linear scale mass indicator for providing a reliable indication of the mass value at which the instrument is operating.

A still further object of the invention is to provide an energizing circuit of the above type which has substantially constant resolving power over the entire range of mass values at which the instrument can be operated.

In practicing the invention, a mass spectrometer of the ion resonance type is provided which utilizes the combined action of crossed magnetic and radio frequency electric fields to effect separation of ions having different mass to charge ratios. The mass spectrometer includes a plurality of electric field producing plates to which an alternating electric signal is supplied by a variable frequency oscillator having a frequency determining circuit with a movable tuning element. The output frequency of the oscillator is inversely related to variations in the value of the movable tuning element, and the value of the movable tuning element is linearly related to movement thereof. The preferred embodiment of the invention further includes a means coupled intermediate the output of the radio frequency oscillator and the electric field producing plates for attenuating the alternating electric signals supplied from the oscillator a desired amount over a predetermined frequency range. In addition, a linear scale mass indicator is mechanically coupled to the movable tuning element in the frequency determining circuit of the oscillator, and is movable in synchronism therewith.

Other objects, features, and attendant advantages of the present invention will be appreciated more readily as the same becomes better understood by reference to the following detailed description, when considered in connection with the accompanying drawings, wherein:

Fig. 1 is a schematic circuit diagram of a novel energizing circuit constructed in accordance with the invention, and shows the same connected to a mass spectrometer of the ion resonance type; and Fig. 2 is a graph illustrating the relationship between an undesired characteristic of the instrument, and the manner in which it is compensated.

A cross-sectional view of an ion resonance mass spectrometer is disclosed in Fig. 1 of the drawings wherein it can be seen that the instrument comprises a housing 11 into which molecules of a gas sample to be analyzed are introduced. Supported within the housing 11 are a plurality of electric field producing plates 12 for producing an alternating electric field across the housing in a direction parallel to the plane of the paper. The housing is supported between the pole pieces of a pair of magnets (not shown) and which produce a magnetic field across the housing in a direction parallel to a perpendicular to the plane of the paper. The innermost electric field producing plates 12 have centrally disposed openings therein for providing an ion path within the housing, and suitable direct current biasing potentials are supplied to the various field producing plates 12 by a biasing circuit arrangement 13. A collector plate 14 is disposed within the housing in a manner such that the ions accelerated by the instrument may impinge thereon and be collected. For a more detailed description of the construction and operation of the instrument, reference is made to a copending application Serial No. 369,169 "Radio Frequency Mass Spectrometer," George Jernakoff, inventor, filed July 20, 1953, and assigned to the same assignee as the present invention; however, briefly, the instrument operates in the manner to be described hereinafter. Molecules of a gas sample to be analyzed are introduced into the housing where they are subjected to bombardment by an electron beam that passes through the central region of the housing in a direction perpendicular to the plane of the paper. This electron beam is produced by an electron gun (not shown) comprising a part of the instrument, and serves to ionize a representative portion of the molecules in the gas sample. The ions thus produced are then subjected to the action of the crossed magnetic and radio frequency electric fields so that ions which possess a natural frequency that correspond to the frequency of the radio frequency electric field are accelerated in spiral paths, in the manner indicated by the dotted lines, and ultimately impinge upon collector plate 14. This operation is expressed in the following equation:

(1) $$m = \frac{K_0 H}{F}$$

where
$m$ = mass of ionized particles
$K_0$ = constant
$H$ = magnetic field strength
$F$ = frequency of alternating electric signal supplied to field producing plates 12

As previously mentioned, in order to effectively use mass spectrometers of the ion resonance type, it is necessary that the instrument be capable of operating over a range of mass values. As can be determined from Equation 1 above, in order to vary the mass value with which the instrument operates, it is necessary to vary either the strength of the magnetic field or the frequency of the radio frequency electric field. Because of certain difficulties that arise if the magnetic field strength is varied, it is desirable that the technique of varying the frequency of the alternating electric field be used in order to vary the mass value at which the instrument is operating. It can be further determined from Equation 1 that the mass value at which the mass spectrometer operates varies inversely with variations in the frequency of the alternating electric field, and in fact is an inverse hyperbolic function of the frequency. To supply an alternating electric field having suitable frequency characteristics, a variable frequency oscillator 15 is provided whose output frequency varies inversely with variations in value of a movable tuning element of the frequency determining circuit thereof, and is in fact an inverse hyperbolic function of the variations in value of the tuning element. For a detailed description of a suitable construction for the oscillator 15, reference is made to an article appearing in the September 1950 issue of Electronics, page 88 and 89, entitled, "Wide Range Frequency Oscillator." However, for the purpose of the present disclosure, it is sufficient to point out that the variable frequency oscillator 15 is a resistance-capacitance tuned oscillator, and includes a frequency determining circuit having a movable tuning element. The frequency determining circuit is comprised by a resistor 16 having a pair of series connected tuning capacitors 17 and 18 connected in parallel therewith which constitute the movable tuning element of the circuit. Each of the tuning capacitors 17 and 18 has a trimmer capacitor 19 and 21, respectively, connected in parallel therewith, and the juncture of the two tuning capacitors, and the two trimmer capacitors are connected to ground through a resistor 22. In order that the oscillator be suitable for the purpose intended, it is necessary that it have at least a 10 to 1 frequency ratio (i. e., the highest frequency which the oscillator is capable of supplying be at least 10 times the value of the lowest frequency supplied thereby), and that the frequency of the output signal vary inversely with movement of the movable tuning element of the frequency determining circuit, namely the tuning capacitors 17 and 18.

The output signal from variable frequency oscillator 15 is supplied through a coupling capacitor to a cathode follower amplifier 23 whose output is supplied through a second coupling capacitor to a final cathode amplifier output stage formed by a pentode tube 24. The output of cathode follower 23 is in turn supplied through a coupling capacitor to the electric field producing plates 12 of the mass spectrometer. The manner in which the variable frequency oscillator 15 coacts with the mass spectrometer tube to produce the desired result, namely, the scanning of the mass values over a predetermined range, is set forth most clearly by the following relations.

The frequency characteristic of the oscillator 15 is expressed by the following equation:

(2) $$F = \frac{K_1}{C} \text{ where } K_1 = \text{a constant } \frac{1}{2\pi R}$$

where R is the resistance of frequency determining circuit
C = capacitance of the frequency determining circuit of the oscillator Substituting Equation 2 into Equation 1 results in the following relationship:

(3) $$m = \frac{K_0 H C}{K_1}$$

Since the terms $K_0 H$ and $K_1$ are all constant in Equation 3 the equation can be simplified to read:

(4) $$m = K_2 C$$

From an examination of Equations 2, 3, and 4, it can be appreciated that the inverse hyperbolic nature of the frequency versus change in capacitance characteristic of the oscillator cancels out or compensates for the inverse hyperbolic nature of the mass versus change in frequency characteristics of the mass spectrometer, and the overall arrangement can be designed so that the mass value at which the spectrometer operates increases or decreases linearly with movement of the tuning capacitors of the oscillator. This may be accomplished by using linear condensors as tuning capacitors 17 and 18 so that there are even incremental changes of capacity for each unit of rotation of the capacitors 17 and 18. Referring again to Equation 4, it can be seen that if, by the above design, the capacitance C is made to vary as a linear function of $\theta$ where $\theta$ is a unit rotation of the tuning capacitor, then it necessarily follows that the mass $m$ likewise varies as a linear function of $\theta$. Hence, the mass values over which the mass spectrometer instrument operates will be linearly related to the rotation of the tuning capacitors 17 and 18, and allows a linear scale mass indicator 25 to be mechanically connected directly to the movable elements of the tuning capacitors 17 and 18 for the purpose of providing an indication of the mass value at which the instrument is operating. By reason of the above-construction, it can be appreciated, therefore, that for each unit of rotation of the tuning capacitors 17 and 18 there will be a hyperbolic increase or decrease of the frequency of the output signal of the oscillator 15 which will effect a compensating hyperbolic increase or decrease in the mass value at which the instrument operates, and, hence, a uniform increase or decrease in the mass value at which the instrument operates. Thus, any tendency to produce crowding of the mass resonant points to which the instrument responds in the higher mass values of the range over which the instrument operates, is avoided. Further, this construction makes it possible to provide the instrument with a linear scale mass indicator that can be provided with only a simple mechanical connection, and which provides a reliable indication of the mass value at which the instrument is operating.

The resolving power of the mass spectrometer of the ion resonance type is expressed by the following equation:

(5) $$RP = \frac{K_5 e H^2}{mE}$$

where
$RP$ = resolving power
$K_5$ = a constant
$e$ = a charge of ionized particle
$E$ = peak value of the alternating voltage supplied by the radio frequency oscillator In view of the fact that $K_5$, $e$ and $H$ are all maintained constant, Equation 5 can be reduced to the following expression:

(6) $$RP = \frac{K}{mE}$$

From an examination of Equation 6, it is readily apparent that as the mass value at which the instrument operates increases, the resolving power of the instrument deteriorates. In order to compensate for this effect it is necessary to provide some means for modifying the amplitude of the alternating electric energy supplied to the field producing plates 12 in a manner such that the product $mE$ remains constant, thereby providing constant resolving power over the entire range of mass values at which the instrument is operated. This means preferably comprises an attenuator coupled intermediate the output of the variable frequency oscillator and the field producing plates 12 of the mass spectrometer. In the specific embodiment of the invention disclosed in Fig. 1 of the drawings, this attenuator constitutes a variable resistor 26 connected in the cathode circuit of the pentode tube 24. Variable resistor 26 comprises a rotary wound resistor having a movable contact 27, and is connected in series circuit relationship with two other resistors 28 and 29 to form a cathode load impedance for the pentode tube 24. Suitable biasing potentials are supplied to the pentode tube 24 by a grid resistor 31, and a choke coil 32 connected in the plate circuit of the tube while a capacitor 33 serves to bypass to ground any radio frequency signal appearing on the plate of the tube. The circuit thus comprised operates in the normal manner of a cathode follower amplifier with the exception that, as the frequency of the output signal from oscillator 15 is decreased so as to tune in higher mass values in the range over which the instrument is designed to operate, movable contact 27 picks up a lower value alternating voltage from the total cathode load potential available by moving toward ground potential, thus serving to attenuate the amplitude of the alternating electric energy supplied by the circuit to the field producing plates of the mass spectrometer a predetermined amount.

The manner in which this circuit is operative to supply the necessary compensation in order to obtain constant resolving power with the mass spectometer, can be better appreciated from the graph illustrated in Fig. 2 of the drawings. In Fig. 2 the solid curve is a plot of the resolving power of the ion resonance mass spectrometer versus particular mass values where the resolving power is plotted as the ordinate, and the mass is plotted as the abscissa. From examination of this curve, it can be seen that the resolving power decreases rapidly from a relatively high value at the lower mass values of the range, assuming that the range extends from mass zero to approximately mass 100. In order to compensate for this variation in resolving power it is necessary to provide an attenuation curve such as illustrated by the dotted line in Fig. 2 wherein the attenuation of the alternating electric energy is plotted as the ordinate and the frequency of the signal is plotted as the abscissa. It can be seen that the attenuation versus frequency curve somewhat approximates the curve of the resolving power versus mass, and as a result will tend to level off the resolving power to a somewhat constant valve so that the instrument will have constant resolving power over the entire range of mass values which it is designed to operate.

In place of the arrangement shown in Fig. 1 of the drawings, a second means for attenuating the amplitude of the alternating electric energy supplied to the field producing plates 12 could comprise an electric energy filter inserted in place of the variable attenuating resistor 26. This electric energy filter should have a band pass characteristic such as that shown by dotted lines in Fig. 2, wherein the lower frequencies in the range can be attenuated. Such an arrangement would have an advantage in that it would not have to be mechanically adjusted synchronously with the tuning of the variable frequency oscillator 15; however, the arrangement shown in Fig. 1 is preferred in that it is simpler to incorporate, and less subject to change.

From the foregoing description, it can be appreciated that the invention provides an energizing circuit for a mass spectrometer of the ion resonance type wherein the particular mass to be analyzed can be operated over a wide range of mass values by varying the frequency of the alternating electric energy supplied to the spectrometer, and wherein a linear relationship exists between the variation in the frequency determining component of the energizing circuit and the variation in mass over the entire mass range to be analyzed. This feature makes it possible to provide a simple and efficient linear scale mass indicator for providing a reliable indication of the mass value at which the instrument is operating. The invention further provides a means for modifying the amplitude of the electric energy supplied to the spectometer so as to obtain constant resolving power with the instrument over the entire range of mass value at which the instrument is operated.

The following table of values for the parameters of the tuning circuit of oscillator 15 and of the cathode follower circuit 24 is cited for purposes of example, and the invention should in no way be considered as limited in use to circuit components having these values only.

Tuning capacitors (17, 18) _____ 20–500 microfarads.
Trimmer capacitors (19, 21) ____ 3–7 microfarads.
Coupling capacitors _____ 0.1 microfarad.
Bypass capacitor (33) _____ 1 microfarad.
Resistor (16) _____ 10 kilohms.
Resistor (22) _____ 2.5 kilohms.
Resistor (26) _____ 6 kilohms.
Resistor (28) _____ 82 ohms.
Resistor (29) _____ 270 ohms.
Resistor (31) _____ 0.1 megohm.
Choke (32) _____ 80 millihenries.
Pentode tube (24) _____ Type 6AG7.

While the invention has been described and illustrated with reference to a particular embodiment, it will be obvious to those skilled in the art that changes may be made herein which are within the full intended scope of the invention as defined by the appended claims.

What I claim as new and desire to secure by Letters Patent of the United States is:

1. In a mass spectrometer of the ion resonance type utilizing the combined action of crossed magnetic and radio frequency electric fields to effect separation of ions having different mass to charge ratios and including a plurality of electric field producing plates to which an alternating electric signal is supplied, the improvement comprising a variable frequency oscillator having a frequency determining circuit with a movable tuning element, the output frequency of the oscillator being inversely related to variations in the value of said movable tuning element, and the variations in value of the movable tuning element being linearly related to movement thereof, and means for operatively coupling the output of said oscillator to the electric field producing plates of the mass spectrometer.

2. A mass spectrometer of the ion resonance type utilizing the combined action of crossed magnetic and radio frequency electric fields to effect separation of ions having different mass to charge ratios and including a plurality of electric field producing plates to which an alternating electric signal is supplied, and a variable frequency oscillator having a frequency determining circuit with a movable tuning element, the output frequency of the oscillator being inversely related to variations in the value of said movable tuning element, and the variations in value of the movable tuning element being linearly related to movement thereof, and means for operatively coupling the output of said oscillator to the electric field producing plates of the mass spectrometer.

3. In a mass spectrometer of the ion resonance type utilizing the combined action of crossed magnetic and radio frequency electric fields to effect separation of ions having different mass to charge ratios and including a plurality of electric field producing plates to which an alternating electric signal is supplied, the improvement comprising a variable frequency oscillator having a resistance-capacitance frequency determining circuit with a movable tuning capacitor, the output frequency of the oscillator being inversely related to variations in the capacitance of the movable tuning capacitor, and the variations in capacitance of the movable tuning capacitor being linearly related to movement of the movable plate thereof, and means for operatively coupling the output of said oscillator to the electric field producing plates of the mass spectrometer.

4. A mass spectrometer of the ion resonance type utilizing the combined action of crossed magnetic and radio frequency electric fields to effect separation of ions having different mass to charge ratios and including a plurality of electric field producing plates to which an alternating electric signal is supplied, and a variable frequency oscillator having a resistance-capacitance frequency determining circuit with a movable tuning capacitor, the output frequency of the oscillator being inversely related to variations in the capacitance of the movable tuning capacitor, and the variations in capacitance of the movable tuning capacitor being linearly related to movement of the movable plate thereof, and means for operatively coupling the output of said oscillator to the electric field producing plates of the mass spectrometer.

5. A mass spectrometer of the ion resonance type utilizing the combined action of crossed magnetic and radio frequency electric fields to effect separation of ions having different mass to charge ratios and including a plurality of electric field producing plates to which an alternating electric signal is supplied, a variable frequency oscillator having a resistance-capacitance frequency determining circuit with a movable tuning capacitor, the output frequency of the oscillator being inversely related to variations in the capacitance of the movable tuning capacitor, and the variations in capacitance of the movable tuning capacitor being linearly related to movement of the movable plate thereof, means for operatively coupling the output of said oscillator to the electric field producing plates of the mass spectrometer, and a linear scale mass indicator mechanically coupled to the movable capacitor plate of the capacitor in said frequency determining circuit and movable in synchronism therewith.

6. In a mass spectrometer of the ion resonance type utilizing the combined action of crossed magnetic and radio frequency electric fields to effect separation of ions having different mass to charge ratios and including a plurality of electric field producing plates to which an alternating electric signal is supplied, the improvement comprising a variable frequency oscillator having a frequency determining circuit with a movable tuning element, the output frequency of the oscillator being inversely related to variations in the value of said movable tuning element, and the variations in value of the movable tuning element being linearly related to movement thereof, and circuit means for operatively coupling the output of said oscillator to the electric field producing plates of the mass spectrometer including and means for attenuating the alternating electric signal supplied from said oscillator a desired amount over a predetermined frequency range.

7. A mass spectrometer of the ion resonance type utilizing the combined action of crossed magnetic and radio frequency electric fields to effect separation of ions having different mass to charge ratios and including a plurality of electric field producing plates to which an alternating electric signal is supplied, a variable frequency oscillator having a frequency determining circuit with a movable tuning element, the output of frequency of the oscillator being inversely related to variations in the value of said movable tuning element, and the variations in value of the movable tuning element being linearly related to movement thereof, and circuit means for operatively coupling the output of said oscillator to the electric field producing plates of the mass spectrometer including and means for attenuating the alternating electric signal supplied from said oscillator a desired amount over a predetermined frequency range.

8. In a mass spectrometer of the ion resonance type utilizing the combined action of crossed magnetic and radio frequency fields to effect separation of ions having different mass to charge ratios and including a plurality of electric field producing plates to which an alternating electric signal is supplied, the improvement comprising a variable frequency oscillator having a resistance-capacitance frequency determining circuit with a movable tuning capacitor, the output frequency of the oscillator being inversely related to variations in the capacitance of the movable tuning capacitor, and the variations in capacitance of the movable tuning capacitor being linearly related to movement of the movable plate thereof, and circuit means operatively coupling the output of said oscillator to the electric field producing plates of the mass spectrometer including means for attenuating the alternating electric signal supplied from said oscillator a desired amount over a predetermined frequency range.

9. A mass spectrometer of the ion resonance type utilizing the combined action of crossed magnetic and radio frequency fields to effect separation of ions having different mass to charge ratios and including a plurality of electric field producing plates to which an alternating electric signal is supplied, a variable frequency oscillator having a resistance-capacitance frequency determining circuit with a movable tuning capacitor, the output frequency of the oscillator being inversely related to variations in the capacitance of the movable tuning capacitor, and the variations in capacitance of the movable tuning capacitor being linearly related to movement of the movable plate thereof, and circuit means for operatively coupling the output of said oscillator to the electric field producing plates of the mass spectrometer including means for attenuating the alternating electric signal supplied from said oscillator a desired amount over a predetermined frequency range.

10. A mass spectrometer of the ion resonance type utilizing the combined action of cross magnetic and radio frequency fields to effect separation of ions having different mass to charge ratios and including a plurality of electric field producing plates to which an alternating electric signal is supplied, a variable frequency oscillator having a resistance-capacitance frequency determining circuit with a movable tuning capacitor, the output frequency of the oscillator being inversely related to variations in the capacitance of the movable tuning capacitor, and the variations in capacitance of the movable tuning capacitor being linearly related to movement of the movable plate thereof, and circuit means operatively coupling the output of said oscillator to the electric field producing plates of the mass spectrometer, said circuit means including a variable resistor for attenuating the alternating electric signal supplied from said oscillator a desired amount over a predetermined frequency range, the movable contact of said variable resistor being interconnected with the movable capacitor plate of said tuning capacitor and movable in synchronism therewith.

11. In a mass spectrometer of the ion resonance type utilizing the combined action of crossed magnetic and radio frequency fields to effect separation of ions having different mass to charge ratios and including a plurality of electric field producing plates to which an alternating electric signal is supplied, a variable frequency oscillator having a resistance-capacitance frequency determining circuit with a movable tuning capacitor, the output frequency of the oscillator being inversely related to variations in the capacitance of the movable tuning capacitor, and the variations in capacitance of the movable tuning capacitor being linearly related to movement of the movable plate thereof, circuit means for operatively coupling the output of said oscillator to the electric field producing plates of the mass spectrometer, said circuit means including a variable resistor for attenuating the alternating electric signal supplied from said oscillator a desired amount over a predetermined frequency range, the movable contact of said variable resistor being interconnected with the movable capacitor plate of said tuning capacitor, and a linear scale mass indicator mechanically coupled to said tuning capacitor and to said variable resistor and movable in synchronism therewith.

12. In a mass spectrometer of the ion resonance type utilizing the combined action of crossed magnetic and radio frequency fields to effect separation of ions having different mass to charge ratios and including a plurality of electric field producing plates to which an alternating electric signal is supplied, the improvement comprising a variable frequency oscillator having a frequency determining circuit with a movable tuning element, the output of frequency of the oscillator being inversely related to variations in the value of said movable tuning element, and the variations in value of the movable tuning element being linearly related to movement thereof, the output of said oscillator being a cathode follower amplifier having the input thereof coupled to the output of said variable frequency oscillator and having a variable load resistor connected in the cathode circuit thereof, the output of said cathode follower amplifier being obtained from the movable contact of said variable resistor, and means for operatively coupling the output of said cathode follower amplifier to the electric field producing plates of the mass spectrometer.

13. A mass spectrometer of the ion resonance type utilizing the combined action of crossed magnetic and radio frequency fields to effect separation of ions having different mass to charge ratios and including a plurality of electric field producing plates to which an alternating electric signal is supplied, a variable frequency oscillator having a frequency determining circuit with a movable tuning element, the output of frequency of the oscillator being inversely related to variations in the value of said movable tuning element, and the variations in value of the movable tuning element being linearly related to movement thereof, a cathode follower amplifier having the input thereof coupled to the output of said variable frequency oscillator, a variable load resistor connected in the cathode circuit of said amplifier, said variable load resistor having a movable contact thereon, means for operatively coupling said movable contact to the electric field producing plates of the mass spectrometer whereby the output of said amplifier is impressed thereon, and means interconnecting said movable contact of said variable resistor with the variable tuning component of the frequency determining circuit in said oscillator and being movable in synchronism therewith.

14. In a mass spectrometer of the ion resonance type utilizing the combined action of crossed magnetic and radio frequency fields to effect separation of ions having different mass to charge ratios and including a plurality of electric field producing plates to which an alternating electric signal is supplied, the improvement comprising a variable frequency oscillator having a resistance-capacitance frequency determining circuit with a movable tuning capacitor, the output frequency of the oscillator being inversely related to variations in the capacitance of the movable tuning capacitor, and the variations in capacitance of the movable tuning capacitor being linearly related to movement of the movable plate thereof, the output of said oscillator being a cathode follower amplifier having the input thereof coupled to the output of said variable frequency oscillator and having a variable load resistor connected in the cathode circuit thereof, and means operatively coupling the output of said cathode follower amplifier from the movable contact of said variable resistor to the electric field producing plates of the mass spectrometer.

15. A mass spectrometer of the ion resonance type utilizing the combined action of crossed magnetic and radio frequency fields to effect separation of ions having different mass to charge ratios and including a plurality of electric field producing plates to which an alternating electric signal is supplied, a variable frequency oscillator having a resistance-capacitance frequency determining circuit with a movable tuning capacitor, the output frequency of the oscillator being inversely related to variations in the capacitance of the movable tuning capacitor, and the variations in capacitance of the movable tuning capacitor being linearly related to movement of the movable plate thereof, a cathode follower amplifier having the input thereof coupled to the output of said variable frequency oscillator, a variable load resistor connected in the cathode circuit and having a movable contact thereon, means for operatively coupling the movable contact of said variable resistor to the electric field producing plates of the mass spectrometer whereby the output of said amplifier is impressed thereon, means interconnecting said movable contact of said variable resistor with the tuning capacitor of said oscillator, and a linear scale mass indicator mechanically coupled to said tuning capacitor and said variable resistor and movable in synchronism therewith.

References Cited in the file of this patent

UNITED STATES PATENTS 2,627,034  Washburn _____ Jan. 27, 1953